(12) United States Patent
de Kraker et al.

(10) Patent No.: US 7,935,777 B2
(45) Date of Patent: May 3, 2011

(54) POLYCARBONATE COMPOSITIONS

(75) Inventors: Kees de Kraker, Nieu en Sint Joosland (NL); Andries Adriaan Volkers, Wouw (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 293 days.

(21) Appl. No.: 12/144,111

(22) Filed: Jun. 23, 2008

(65) Prior Publication Data

US 2009/0318604 A1    Dec. 24, 2009

(51) Int. Cl.
| | |
|---|---|
| *C08L 69/00* | (2006.01) |
| *C08G 63/123* | (2006.01) |
| *C08G 63/133* | (2006.01) |
| *C08G 63/18* | (2006.01) |
| *C08G 63/19* | (2006.01) |
| *C08G 63/193* | (2006.01) |
| *C08G 63/195* | (2006.01) |
| *C08G 64/00* | (2006.01) |
| *C08G 77/04* | (2006.01) |
| *C08K 67/03* | (2006.01) |

(52) U.S. Cl. ........ 528/125; 528/127; 528/128; 528/196; 528/201; 528/203; 548/470; 548/482

(58) Field of Classification Search .................. 528/125, 528/127, 128, 196, 201, 203; 548/470, 482
See application file for complete search history.

(56) References Cited

U.S. PATENT DOCUMENTS

| | | | |
|---|---|---|---|
| 7,135,538 B2 * | 11/2006 | Glasgow et al. ............... 528/196 |
| 7,491,788 B1 * | 2/2009 | Leenders et al. ............... 528/196 |
| 2005/0222334 A1 | 10/2005 | Srinivasan et al. | |
| 2005/0288517 A1 | 12/2005 | Rai et al. | |
| 2007/0010619 A1 | 1/2007 | Chatterjee et al. | |
| 2007/0123683 A1 | 5/2007 | Arumugam et al. | |
| 2008/0011513 A1 * | 1/2008 | Kamps et al. .................. 174/565 |
| 2008/0029744 A1 | 2/2008 | Jansen et al. | |
| 2008/0033108 A1 | 2/2008 | Kung et al. | |
| 2009/0088504 A1 * | 4/2009 | Chatterjee et al. ............. 524/158 |

* cited by examiner

*Primary Examiner* — Kelechi C Egwim
(74) *Attorney, Agent, or Firm* — Polsinelli Shughart PC; Timothy J. Keefer; Todd Hofmeister

(57) ABSTRACT

Polycarbonate compositions are disclosed. The compositions comprise a polycarbonate polymer (A) having repeating units derived from 2-phenyl-3,3-bis(4-hydroxyphenyl)phthalimidine (PPPBP); a polycarbonate polymer (B) which is different from polymer (A); an impact modifier (C) which is different from polymer (A) and polymer (B); and talc filler (D). The resulting composition has an improved combination of properties, particularly heat resistance, low temperature impact performance, and viscosity.

18 Claims, No Drawings

POLYCARBONATE COMPOSITIONS

CROSS-REFERENCE TO RELATED APPLICATIONS

The present application is related to U.S. patent application Ser. No. 12/144,055, filed concurrently, also titled "POLYCARBONATE COMPOSITIONS". That application is hereby fully incorporated herein by reference.

BACKGROUND

The present disclosure relates to thermoplastic polycarbonate compositions having, among other characteristics, improved heat resistance. In particular, the disclosure relates to such polycarbonate compositions, and polycarbonate blends thereof, having improved heat resistance, impact performance, and/or flow properties. Also included herein are methods for preparing and/or using the same, as well as articles formed from such compositions/blends.

Polycarbonates (PC) are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution. Polycarbonates are a useful class of polymers having many desired properties. They are highly regarded for optical clarity and enhanced impact strength and ductility at room temperature or below.

Impact modifiers are incorporated into polymeric resins to improve the impact strength of finished articles made from such resins. Exemplary impact modifiers include acrylonitrile-butadiene-styrene (ABS) and methacrylate-butadiene-styrene (MBS) polymers. ABS and MBS polymers are synthetic thermoplastic resins made by polymerizing acrylonitrile or methacrylate, respectively, with styrene in the presence of polybutadiene. The properties of ABS and MBS can be modified by varying the relative proportions of the basic components, the degree of grafting, the molecular weight, etc. Overall, ABS and MBS are generally strong, and lightweight thermoplastics.

Blends of polycarbonates with ABS or MBS, or PC/ABS or PC/MBS blends, are also well-known. For example, SABIC Innovative Plastics provides such blends commercially under the brand name CYCOLOY®. These amorphous thermoplastic blends have many desired properties and/or characteristics, including high impact strength, heat resistance, good processability, weather and ozone resistance, good ductility, electrical resistance, aesthetic characteristics, etc. They are widely used in the automotive market, for producing appliance and electrical components, decorative articles, medical devices, and office and business equipment such as computer housings, cell phone casings, etc.

There remains a need in the art for thermoplastic polycarbonate compositions having improved heat resistance. Desirable features of such materials include, among others, excellent mechanical properties and ease of manufacture.

BRIEF DESCRIPTION

Disclosed, in various embodiments, are 2-phenyl-3,3-bis (4-hydroxyphenyl)phthalimidine (PPPBP) based polycarbonate compositions, and/or blends thereof, that have an improved combination of properties. These compositions/blends have improved heat resistance and suitably maintain their mechanical and/or processing properties as well. Methods for preparing and/or using the same, such as for forming articles which are stable under relatively high temperature conditions, are also disclosed.

In embodiments, a thermoplastic composition is disclosed which comprises:
  a polycarbonate polymer (A) having repeating units derived from 2-phenyl-3,3-bis(4-hydroxyphenyl)phthalimidine (PPPBP);
  a polycarbonate polymer (B) which is different from polymer (A);
  an impact modifier (C) which is different from polymer (A) and polymer (B); and
  mineral filler (D).

Polymer (A) may be a copolymer of PPPBP and bisphenol-A. Polymer (B) may be a homopolymer.

In some embodiments, the impact modifier (C) is selected from the group consisting of a polycarbonate-polysiloxane copolymer, ABS, MBS, an acrylate polymer, and combinations thereof. The polycarbonate-polysiloxane copolymer may contain about 20 wt % of siloxane units. Alternatively, the impact modifier (C) is a combination of polycarbonate-polysiloxane copolymer and acrylate polymer.

The polymer (A) may comprise from about 10 to about 85 weight percent of the thermoplastic composition; the polymer (B) may comprise from about 5 to about 85 weight percent of the thermoplastic composition; the impact modifier (C) may comprise from about 5 to about 45 weight percent of the thermoplastic composition; and/or the mineral filler (D) may comprise from about 4 to about 12 weight percent of the thermoplastic composition. In some embodiments, the mineral filler is talc.

In some embodiments, the thermoplastic composition has a heat deflection temperature of at least 150° C., when measured according to ISO 75. In alternate embodiments, the thermoplastic composition has an apparent viscosity of 200 Pa·sec or less, when measured at 320° C. and at a shear rate of 1500 sec$^{-1}$.

In some specific embodiments, the thermoplastic composition has a heat deflection temperature of at least 150° C., when measured according to ISO 75; and an apparent viscosity of 200 Pa·sec or less, when measured at 320° C. and at a shear rate of 1500 sec$^{-1}$.

The thermoplastic composition may further comprise a styrene-acrylonitrile polymer (E) in an amount of from about 3 to about 15 weight percent of the thermoplastic composition.

In other embodiments, a thermoplastic composition is disclosed which comprises:
  a polycarbonate polymer (A) having repeating units derived from 2-phenyl-3,3-bis(4-hydroxyphenyl)phthalimidine (PPPBP);
  a polycarbonate polymer (B) which is different from polymer (A);
  either (i) a polycarbonate-polysiloxane polymer (C1) which is different from polymers (A) and (B) or (ii) an acrylate impact modifier (C2); and
  talc filler (D).

In other embodiments, a thermoplastic composition is disclosed which comprises:
  from about 50 to about 75 weight percent of a polycarbonate polymer (A) having repeating units derived from 2-phenyl-3,3-bis(4-hydroxyphenyl)phthalimidine (PPPBP);
  from about 8 to about 15 weight percent of a polycarbonate polymer (B) which is different from polymer (A);

a polycarbonate-polysiloxane polymer (C1);
an acrylate impact modifier (C2); and
from about 4 to about 12 weight percent of a talc filler (D);
wherein polycarbonate-polysiloxane polymer (C1) and acrylate impact modifier (C2) together comprise from about 5 to about 45 weight percent of the thermoplastic composition.

Articles formed from the thermoplastic compositions are also disclosed.

These and other non-limiting features or characteristics of the present disclosure will be further described below.

DETAILED DESCRIPTION

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity).

The term "integer" means a whole number and includes zero. For example, the expression "n is an integer from 0 to 4" means n may be any whole number from 0 to 4, including 0.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen ("Alkyl"). Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted or unsubstituted. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The term "cycloaliphatic" refers to an array of atoms which is cyclic but which is not aromatic. The cycloaliphatic group may include heteroatoms such as nitrogen, sulfur, selenium, silicon and oxygen, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1, 4,4-tetramethylcyclobutyl, piperidinyl, and 2,2,6,6-tetramethylpiperydinyl.

In embodiments, the thermoplastic compositions of the present disclosure comprise a polycarbonate polymer (A) having repeating units derived from 2-phenyl-3,3-bis(4-hydroxyphenyl)phthalimidine (PPPBP); a polycarbonate polymer (B) which is different from polymer (A); an impact modifier (C) which is different from polymer (A) and polymer (B); and a mineral filler (D). The thermoplastic composition is a blend of the components (A), (B), (C), and (D).

As used herein, the terms "polycarbonate" and "polycarbonate polymer" mean compositions having repeating structural carbonate units of the formula (1):

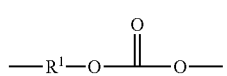

(1)

in which at least about 60 percent of the total number of R$^1$ groups are aromatic organic radicals and the balance thereof are aliphatic, alicyclic, or aromatic radicals. In one embodiment, each R$^1$ is an aromatic organic radical, for example a radical of the formula (2):

(2)

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, wherein R$^1$ is as defined above. Dihydroxy compounds suitable in an interfacial reaction include the dihydroxy compounds of formula (A) as well as dihydroxy compounds of formula (3)

wherein Y$^1$, A$^1$ and A$^2$ are as described above. Also included are bisphenol compounds of general formula (4):

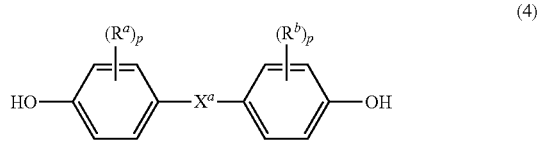

wherein R$^a$ and R$^b$ each represent a halogen atom or a monovalent hydrocarbon group and may be the same or different; p and q are each independently integers of 0 to 4; and X$^a$ represents one of the groups of formula (5):

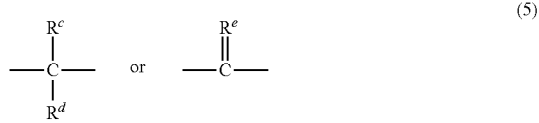

wherein R$^c$ and R$^d$ each independently represent a hydrogen atom or a monovalent linear or cyclic hydrocarbon group and R$^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even desired, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

"Polycarbonates" and "polycarbonate polymers" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units of the formula (1), repeating units of formula (6)

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a C620 alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In other embodiments, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (8):

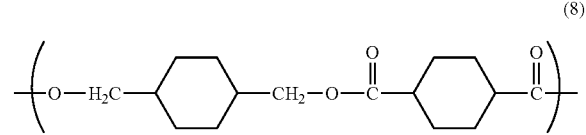

(8)

wherein, as described using formula (6), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

Another exemplary copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (9) (sometimes referred to herein as 'siloxane'):

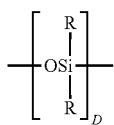

(9)

wherein each occurrence of R is same or different, and is a $C_{1-3}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (9) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (10):

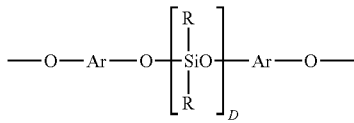

(10)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (10) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula (11):

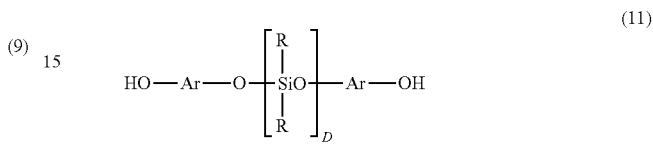

(11)

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

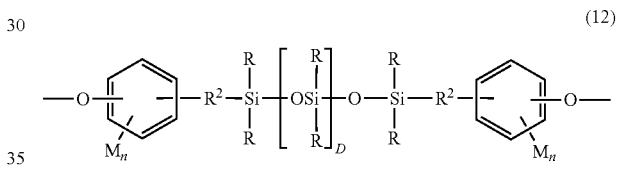

(12)

wherein R and D are as defined above. $R^2$ in formula (12) is a divalent $C_2$-$C_8$ aliphatic group. Each M in formula (19) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (13):

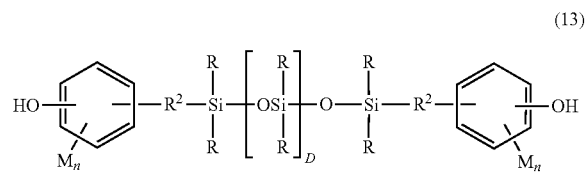

(13)

wherein R, D, M, $R^2$, and n are as described above.

Such dihydroxy polysiloxanes can be made by effecting a platinum catalyzed addition between a siloxane hydride of the formula (14),

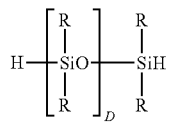

(14)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

A polycarbonate-polysiloxane copolymer may be manufactured by reaction of diphenolic polysiloxane (13) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., desirably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of a polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt % to about 99 wt % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt % to about 75 wt %, or about 1 wt % to about 50 wt % polydimethylsiloxane, or an equivalent molar amount of another polydiorganosiloxane. In one embodiment, the copolymer comprises about 5 wt % to about 40 wt %, optionally about 5 wt % to about 25 wt % polydimethylsiloxane, or an equivalent molar amount of another polydiorganosiloxane, with the balance being polycarbonate. In a particular embodiment, the copolymer may comprise about 20 wt % siloxane.

Polycarbonate polymer (A) has repeating units derived from 2-phenyl-3,3-bis(4-hydroxyphenyl)phthalimidine (PPPBP), having the structure of Formula (1):

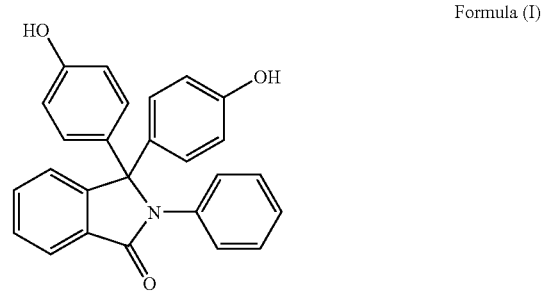

Formula (I)

The para,para form of PPPBP (the hydroxyls being in the para position) is preferred to the ortho-para form, which is less desired.

Polycarbonate polymer (A) is generally a copolymer of PPPBP and another monomer. The molar ratio of PPPBP to the other monomer may be from about 10:90 to about 90:10, from about 20:80 to about 80:20, from about 25:75 to about 75:25, from about 30:70 to about 70:30, from about 32:68 to about 68:32, or about 50:50. Desirably, the molar ratio is from about 20:80 to about 80:20. In specific embodiments, polymer (A) is a copolymer of PPPBP and bisphenol-A. The PPPBP is present in the amount of from about 20 to about 80 mole percent of the copolymer.

Polycarbonate polymer (B) is different from polycarbonate polymer (A). In certain embodiments, polycarbonate polymer (B) is a homopolymer, particularly a bisphenol-A homopolymer. Polycarbonate polymer (B) may also be a blend or mixture of more than one polycarbonate. For example, a high flow and a low flow polycarbonate that are blended together may be considered as polycarbonate polymer (B). In some embodiments, the weight ratio of polycarbonate polymer (A) to polycarbonate polymer (B) may range from about 1:8 to about 6:1.

The thermoplastic composition further comprises one or more impact modifiers (C) to increase the impact strength of the thermoplastic composition. The impact modifier (C) is different from both polycarbonate polymers (A) and (B).

The impact modifier may include an elastomer-modified graft copolymer comprising (i) an elastomeric (i.e., rubbery) polymer substrate having a Tg less than about 10° C., more specifically less than about −10° C., or more specifically about −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. As used herein, the terminology "(meth)acrylate monomers" refers collectively to acrylate monomers and methacrylate monomers.

Suitable conjugated diene monomers for preparing the elastomer phase are of formula (15):

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (16):

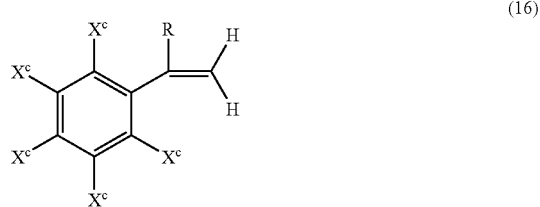

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (17):

wherein R is hydrogen, $C_1$-$C_5$ alkyl, bromo, or chloro, and $X^d$ is cyano, $C_1$-$C_{12}$ alkoxycarbonyl, $C_1$-$C_{12}$ aryloxycarbonyl, hydroxy carbonyl, or the like. Examples of monomers of formula (17) include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl(meth)acrylate, n-butyl(meth)acrylate, t-butyl (meth)acrylate, n-propyl(meth)acrylate, isopropyl(meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt % of comonomers of formulas (15), (16), or (17). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and desirably has a gel content greater than 70%. Also suitable are mixtures of butadiene with styrene and/or $C_{4-6}$ alkyl acrylate rubbers.

The elastomeric phase may provide about 5 wt % to about 95 wt % of the total graft copolymer, more specifically about 20 wt % to about 90 wt %, and even more specifically about 40 wt % to about 85 wt % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (16) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (17). In one embodiment, R is hydrogen or $C_1$-$C_2$ alkyl, and $X^d$ is cyano or $C_1$-$C_{12}$ alkoxycarbonyl. Specific examples of suitable comonomers for use in the rigid phase include acrylonitrile, ethacrylonitrile, methacrylonitrile, methyl(meth)acrylate, ethyl(meth)acrylate, n-propyl(meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt % of monovinyl aromatic monomer, specifically about 30 to about 100 wt %, more specifically about 50 to about 90 wt % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 wt % to about 95 wt % elastomer-modified graft copolymer and about 5 wt % to about 65 wt % graft (co)polymer, based on the total weight of the impact modifier. In another embodiment, such impact modifiers comprise about 50 wt % to about 85 wt %, more specifically about 75 wt % to about 85 wt % rubber-modified graft copolymer, together with about 15 wt % to about 50 wt %, more specifically about 15 wt % to about 25 wt % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^g)C(O)OCH_2CH_2R^h$, wherein $R^g$ is hydrogen or a $C_1$-$C_8$ linear or branched hydrocarbyl group and $R^h$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (16) or (17), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane, to afford silicone rubber having an average particle size from about 100 nanometers to about 2 micrometers. At least one branched acrylate rubber monomer is then polymerized with the silicone rubber particles, optionally in the presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

If desired, the foregoing types of impact modifiers may be prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines, or any other material, such as an acid, that contains a degradation catalyst. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company (now SABIC Innovative Plastics). In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other exemplary elastomer-modified graft copolymers include acrylonitrile-butadiene-styrene (ABS), acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to about 50 wt %, optionally greater than or equal to about 60 wt % by weight of the graft polymer. The rubber is desirably present in an amount less than or equal to about 95 wt %, optionally less than or equal to about 90 wt % of the graft polymer.

The rubber forms the backbone of the graft polymer, and is desirably a polymer of a conjugated diene having the formula (18):

wherein $X^e$ is hydrogen, $C_1$-$C_5$ alkyl, chlorine, or bromine. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing dienes, and the like. A desired conjugated diene is butadiene. Copolymers of conjugated dienes with other monomers may also be used, for example copolymers of butadiene-styrene, butadiene-acrylonitrile, and the like. Alternatively, the backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting.

After formation of the backbone polymer, a grafting monomer is polymerized in the presence of the backbone polymer. One desired type of grafting monomer is a monovinylaromatic hydrocarbon having the formula (19):

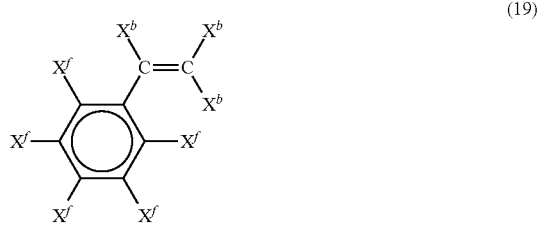

wherein $X^b$ is as defined above and $X^f$ is hydrogen, $C_1$-$C_{10}$ alkyl, $C_1$-$C_{10}$ cycloalkyl, $C_1$-$C_{10}$ alkoxy, $C_6$-$C_{18}$ alkyl, $C_6$-$C_{18}$ aralkyl, $C_6$-$C_{18}$ aryloxy, chlorine, bromine, and the like. Examples include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures comprising at least one of the foregoing compounds, and the like.

A second type of grafting monomer that may be polymerized in the presence of the polymer backbone are acrylic monomers of formula (20):

wherein $X^b$ is as previously defined and $Y^2$ is cyano, $C_1$-$C_{12}$ alkoxycarbonyl, or the like. Examples of such acrylic monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like.

A mixture of grafting monomers may also be used, to provide a graft copolymer. An example of a suitable mixture comprises a monovinylaromatic hydrocarbon and an acrylic monomer. Examples of graft copolymers suitable for use include, but are not limited to, acrylonitrile-butadiene-styrene (ABS) and methacrylonitrile-butadiene-styrene (MBS) resins. Suitable high-rubber acrylonitrile-butadiene-styrene resins are available from SABIC Innovative Plastics (formerly General Electric Company) as BLENDEX® grades 131, 336, 338, 360, and 415.

In specific embodiments, the impact modifier (C) is selected from the group consisting of a polycarbonate-polysiloxane copolymer, ABS, MBS, and an acrylate polymer. In particular embodiments, the polycarbonate-polysiloxane copolymer contains about 20 wt % siloxane units.

In other specific embodiments, the impact modifier (C) is a combination of polycarbonate-polysiloxane copolymer (C1) and an acrylate polymer (C2). It was unexpectedly discovered that such a combination resulted in a synergistic improvement in impact resistance, low temperature impact performance, and viscosity that is not possible or expected from the two components separately.

The acrylate polymer useful as an impact modifier can be prepared by any polymerization process known in the art, such as emulsion, suspension, dispersion or solution polymerization. Preferably the acrylate polymer is prepared by emulsion polymerization. The acrylate polymer is prepared from acrylic monomers such as acrylic acid, methacrylic acid and the $C_1$-$C_{24}$ alkyl esters of acrylic and methacrylic acids. Exemplary $C_1$-$C_{24}$ alkyl groups of esters of acrylic and methacrylic acids include: methyl, propyl, isopropyl, butyl, isobutyl, sec-butyl, t-butyl, amyl, isoamyl, t-amyl, hexyl, cyclohexyl, 2-ethylhexyl, octyl, decyl, lauryl, myristyl, cetyl and stearyl groups.

Exemplary acrylate polymers include: methyl methacrylate, ethyl acrylate, or n-butyl acrylate, 2-ethylhexyl acrylate, lauryl methacrylate, isodecyl methacrylate, methyl acrylate, ethyl methacrylate, sec-butyl acrylate and t-butyl methacrylate.

Other comonomers may be used along with the acrylic monomers to prepare the acrylate polymers. These comonomers include other ethylenically-unsaturated, polymerizable monomers such as, for example, vinylidiene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of ether alcohols such as diethylene glycol monoethyl or monobutyl ether methacrylate, $C_1$-$C_{10}$ alkyl esters of beta-acryloxypropionic acid and higher oligomers of acrylic acid, styrene and alkyl substituted styrenes and vinyl aromatics including alpha-methylstyrene, mixtures of ethylene and other alkylolefins such as propylene, butylene, pentene and the like, vinyl esters such as methyl vinyl ether, ethyl vinyl ether, vinyl 2-methoxyethyl ether and vinyl 2-chloroethyl ether.

Additional comonomers include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms.

Other monomers useful in preparing the acrylate polymer are carboxylic acids such as acrylic acid, methacrylic acid, acryloxycarboxylic acid and higher oligomers of acrylic acid and mixtures thereof, ethacrylic acid, itaconic acid, aconitic acid, crotonic acid, citraconic acid, maleic acid, fumaric acid, alpha-chloracrylic acid, cinnamic acid, mesaconic acid and mixtures thereof. Additional comonomers also include ethylenically-unsaturated monomers containing amine, amide, anhydride and thiol functionality.

The acrylate polymer can have any glass transition temperature (Tg) and any molecular weight. Preferably, the acrylate polymer has a Tg from about −20° C. to about 100° C.; including from about 10° C. to about 50° C. Desirably, the acrylate polymer has a weight average molecular weight of about 50,000 or greater.

The thermoplastic composition further comprises a mineral filler (D). As used herein, the term "mineral filler" includes any synthetic or naturally occurring reinforcing agents for polycarbonates and polycarbonate blends that produces balanced physical properties and does not degrade the polycarbonate or polycarbonate blend. Exemplary mineral include silicates and silica powders such as aluminum silicate (mullite), synthetic calcium silicate, zirconium silicate, fused silica, crystalline silica graphite, natural silica sand, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; kaolin, including hard kaolin, soft kaolin, calcined kaolin, kaolin comprising various coatings known in the art to facilitate compatibility with the polymeric matrix resin, or the like; metals and metal oxides such as particulate or fibrous aluminum, bronze, zinc, copper and nickel or the like; mica, clay, feldspar, flue dust, fillite, quartz, quartzite, perlite, tripoli, diatomaceous earth, carbon black, or the like, or combinations comprising at least one of the foregoing fillers.

The fillers may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. The filler is generally used in amounts of about 4 to about 12 weight percent of the thermoplastic composition.

The mineral filler may be treated with an acid or an acid salt, or the composition may include an acid or acid salt. In one embodiment, the acid or acid salt is an inorganic acid or inorganic acid salt. In one embodiment, the acid is an acid comprising a phosphorous containing oxy-acid. In one embodiment, the phosphorous containing oxy-acid is a multiprotic phosphorus containing oxy-acid having the general formula (21):

$$H_m P_t O_n \quad (21)$$

where m and n are each 2 or greater and t is 1 or greater. Examples of the acids of formula (21) include, but are not limited to, acids represented by the following formulas: $H_3PO_4$, $H_3PO_3$, and $H_3PO_2$. Other exemplary acids include phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid. Alternatively, acids and acid salts, such as, for example, sulphuric acid, sulphites, mono zinc phosphate, mono calcium phosphate, sodium acid pyrophosphate, mono natrium phosphate, and the like, may be used. The acid or acid salt is preferably selected so that it can be effectively combined with the mineral filler to produce a synergistic effect and a balance of properties, such as flow and impact, in the polycarbonate or polycarbonate blend.

In specific embodiments, the mineral filler (D) is talc. Generally, the talc can be of any shape, including fibrous, modular, needle shaped, or lamellar. If desired, the talc may be coated with a layer of metallic material to facilitate conductivity, or surface treated with silanes to improve adhesion and dispersion with the polymeric matrix resin. The talc may also be treated with acid. In such embodiments, the weight ratio of acid to talc, or acid:talc weight ratio, may be from about 0.02 to about 0.04.

In embodiments, the thermoplastic composition comprises about 10 to about 85 wt % polycarbonate polymer (A); about 5 to about 85 wt % polycarbonate polymer (B); about 5 to about 45 wt % impact modifier (C); and from about 1 to about 20 wt % talc filler (D). In more specific embodiments, the thermoplastic composition comprises about 50 to about 75 wt % polycarbonate polymer (A); about 8 to about 15 wt % polycarbonate polymer (B); and about 15 to about 20 wt % impact modifier (C). In other specific embodiments, the talc filler (D) comprises from about 4 to about 12 wt %, about 4 wt %, about 8 wt %, or about 12 wt % of the composition. In other embodiments, the thermoplastic composition comprises from about 10 to about 35 wt % impact modifier (C).

In additional embodiments, the thermoplastic composition further comprises a styrene-acrylonitrile (SAN) polymer (E) in an amount of from about 3 to about 15 weight percent of the thermoplastic composition, including from about 3 to about 10 weight percent. The SAN polymer may function to compatibilize the polymer components (A), (B), and (C) and to enhance the flow of the thermoplastic composition.

It should be noted that ABS polymers and other rubber-based polymers, which may be used as the impact modifier (B), may contain "free" styrene-acrylonitrile polymer as a result of incomplete polymerization with the butadiene during the manufacture of ABS. The "free" SAN content may range from single digits to greater than 50% of the ABS polymer. This "free" SAN in the ABS polymer or rubber-based polymer is considered an impurity or byproduct, and should not be considered as the SAN polymer (E).

The resulting thermoplastic compositions have a combination of desired properties, including improved heat resistance, low temperature impact performance, impact resistance, and viscosity (i.e. flow). The thermoplastic composition may have a heat deflection temperature of at least 150° C., when measured according to ISO 75; a notched Izod impact strength of 10 kJ/m$^2$ or greater at 0° C., when measured according to ISO 180; a tensile modulus of at least 2600 MPa when measured according to ISO 527; or an apparent viscosity of 200 Pa·sec or less, when measured at 320° C. and at a shear rate of 1500 sec$^{-1}$. In other embodiments, the thermoplastic composition meets two of these requirements and in some embodiments, all four of these requirements.

For heat deflection temperature, a higher value indicates better heat resistance. For notched Izod impact strength, a higher value indicates better impact resistance. A lower multiaxial ductile/brittle transition temperature is better; it indicates the temperature at which half of the tested plaques remain in one piece. Finally, a lower value for viscosity indicates that the composition flows easier, which is desired.

The thermoplastic composition may also include various additives, with the proviso that the additives do not adversely affect the desired properties of the thermoplastic compositions. Mixtures of additives may be used. Such additives may be mixed at a suitable time during the mixing of the components for forming the composition.

The thermoplastic composition may comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris (nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)
propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight of the composition components (A), (B), (C) and (D).

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of the composition components (A), (B), (C) and (D).

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of the composition components (A), (B), (C) and (D).

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of the composition components (A), (B), (C) and (D).

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.1 to about 20 parts by weight, optionally about 1 to about 10 parts by weight, based on 100 parts by weight of the composition components (A), (B), (C) and (D).

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide (polyetheramide) block copolymers, polyetheresteramide block copolymers, polyetheresters, or polyurethanes, each containing polyalkylene glycol moieties such as polyethylene glycol, polypropylene glycol, polytetramethylene glycol, and the like. Such polymeric antistatic agents are commercially available, such as, for example, Pelestat™ 6321 (Sanyo), Pebax™ MH1657 (Atofina), and Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 10 parts by weight, based on 100 parts by weight of the composition components (A), (B), (C) and (D).

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the composition components (A), (B), (C) and (D).

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 10 ppm, based on 100 parts by weight of the composition components (A), (B), (C) and (D).

Suitable flame retardants that may be added may be organic compounds that include phosphorus, bromine, and/or chlorine. Non-brominated and non-chlorinated phosphorus-containing flame retardants may be desired in certain applications for regulatory reasons, for example organic phosphates and organic compounds containing phosphorus-nitrogen bonds.

Halogenated materials may also be used as flame retardants, for example halogenated compounds and resins of formula (22):

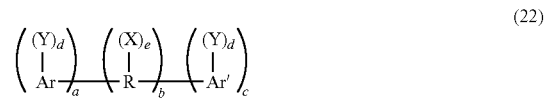

(22)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like. Ar and Ar' in formula (22) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and optionally two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant.

Inorganic flame retardants may also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or a fluoroanion complex such as $Li_3AlF_6$, $BaSiF_6$, $KBF_4$, $K_3AlF_6$, $KAlF_4$, $K_2SiF_6$, and/or $Na_3AlF_6$ or the like.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt % PTFE and about 50 wt % SAN, based on the total weight of the encapsulated fluoropolymer. The SAN may comprise, for example, about 75 wt % styrene and about 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide or ammonia gas, such as azodicarbonamide, metal salts of azodicarbonamide, 4,4' oxybis(benzenesulfonylhydrazide), sodium bicarbonate, ammonium carbonate, or the like; or combinations comprising at least one of the foregoing blowing agents.

The thermoplastic compositions may be manufactured by methods generally available in the art. For example, in one embodiment, in one manner of proceeding, the composition components (A), (B), (C) and (D) and any other optional components (such as antioxidants, mold release agents, and the like) are first blended, in a Henschel™ high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

The increased heat resistance of the thermoplastic compositions allows the compositions to be used in high heat products and industrial applications such as painting and in high temperature environments.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive panel and trim. Examples of suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft;

jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming. The articles made from the composition of the present invention may be used widely in automotive industry, home appliances, electrical components, and telecommunications.

The following examples are provided to illustrate the polycarbonate compositions, articles, and methods of the present disclosure. The examples are merely illustrative and are not intended to limit the disclosure to the materials, conditions, or process parameters set forth therein.

EXAMPLES

Mechanical properties were measured according to the following ISO standards, as indicated:

|  | Standards | Testing Conditions |
| --- | --- | --- |
| Tensile Modulus | ISO 527 | 5 mm/min, 25° C. |
| Notched Izod Impact Strength | ISO 180 | Various temp |
| Melt Viscosity | ISO 11443 | 320° C., 1500 sec$^{-1}$ |
| Heat Deflection Temperature | ISO 75 | 1.8 MPa, flat |
| Multi-Axial Impact Ductile/Brittle | ISO 6603 | 6.6 m/s, various Temp |
| Vicat B50 | ISO 306 | B/50 |

The Multi-Axial Impact Ductile/Brittle (MAI D/B) transition temperature was the temperature at which half of the plaques being tested remained in one piece. It was also noted in the MAI D/B tests whether the failure mode was brittle or ductile in nature. Brittle failure meant that the molded bar completely broke into unconnected pieces in the test, and ductile failure meant that the pieces of the molded bar remained connected after the test.

The Examples discussed herein used the following ingredients in their compositions:

| Ingredient | Description | Supplier |
| --- | --- | --- |
| PPPBP/BPA copolymer | BPA polycarbonate/PPPBP copolymer, about 68/32 mol/mol, having a Mw of about 25,000 Daltons versus polycarbonate standards | SABIC Innovative Plastics |
| PC-1 | Low flow BPA polycarbonate polymer resin made by the melt process with a Mw of about 29,600 Daltons versus polycarbonate standards; PC split = 10% | SABIC Innovative Plastics |
| PC-2 | High flow BPA polycarbonate polymer resin made by the melt process with a Mw of about 21,700 Daltons versus polycarbonate standards | SABIC Innovative Plastics |
| PC-Si | a BPA polycarbonate-polysiloxane copolymer comprising about 20% by weight of siloxane, 80% by weight BPA, PCP encapped | SABIC Innovative Plastics |
| Paraloid ™ | Butylacrylate-methylmethacrylate core-shell rubber (Grade EXL 3300) | Rohm and Haas |
| SAN | High flow SAN having about 27% acrylonitrile, MFR (220° C./5 kg) of 14 to 20 g/10 min. | SABIC Innovative Plastics |
| talc | fine talc (magnesium silicate hydrate), (Grade Jetfine 3CA), stabilized with phosphonic acid (45% aqueous solution) in weight ratio 0.03:1 acid:talc | Luzenac Europe |

The Examples were prepared by melt extrusion on a Werner & Pfleiderer™ 25 mm twin screw extruder at a nominal melt temperature of about 320° C., about 0.7 bars of vacuum, and about 450 rpm. The extrudate was pelletized and dried at about 100° C. for about 2 hours. To make test specimens, the dried pellets were injection molded on an 110-ton Engel™ injection molding machine at a nominal melt temperature of 320° C. All Samples in the Example compositions contained 0.04 weight percent primary antioxidant (Irganox™ 1076, which is a hindered phenol), 0.08 weight percent secondary antioxidant (Irgafos™ 168, which is a phosphite), 0.3 weight percent PETS (Pentaerythritol tetrastearate (mold release, 90% esterified))—all based on 100 parts by weight of the composition.

Example 1

12 example compositions E1-E12 were made and their properties tested. They varied in (i) the amount of talc filler and (ii) the type and ratio of impact modifier(s) to polycarbonates. The ratios of the other ingredients were maintained as the amount of talc filler increased. The compositions and results are shown below in Table 1 organized by amount of talc filler and in Table 2 organized by the type and ratio of impact modifier(s). The compositions are given in weight percent.

TABLE 1

| Table 1 | unit | E1 | E2 | E3 | E4 | E5 | E6 | E7 | E8 | E9 | E10 | E11 | E12 |
| --- | --- | --- | --- | --- | --- | --- | --- | --- | --- | --- | --- | --- | --- |
| PPP BP/BPA copolymer PC | % | 62.00 | 70.00 | 74.00 | 59.52 | 67.20 | 71.04 | 57.04 | 64.40 | 68.08 | 54.56 | 61.60 | 65.12 |
| PC-1 | % | 13.50 | 13.50 | 9.00 | 12.96 | 12.96 | 8.64 | 12.42 | 12.42 | 8.28 | 11.88 | 11.88 | 7.92 |
| PC-2 | % | 1.50 | 1.5 | 1.00 | 1.44 | 1.44 | 0.96 | 1.38 | 1.38 | 0.92 | 1.32 | 1.32 | 0.88 |
| PC-Si | % | 15.00 | 15.00 |  | 14.40 | 14.40 |  | 13.80 | 13.80 |  | 13.20 | 13.20 |  |
| Paraloid ™ | % | 4.00 |  | 8.00 | 3.84 |  | 7.68 | 3.68 |  | 7.36 | 3.52 |  | 7.04 |

TABLE 1-continued

| Table 1 | unit | E1 | E2 | E3 | E4 | E5 | E6 | E7 | E8 | E9 | E10 | E11 | E12 |
|---|---|---|---|---|---|---|---|---|---|---|---|---|---|
| SAN | % | 4.00 | | 8.00 | 3.84 | | 7.68 | 3.68 | | 7.36 | 3.52 | | 7.04 |
| Talc | % | 0 | 0 | 0 | 4 | 4 | 4 | 8 | 8 | 8 | 12 | 12 | 12 |
| Tensile modulus | MPa | 2185 | 2290 | 2244 | 2602 | 2747 | 2695 | 2905 | 3114 | 3132 | 3477 | 3697 | 3735 |
| INI @ 25° C. | kJ/m$^2$ | 30 | 28 | 23 | 19 | 16 | 12 | 12 | 12 | 9 | 12 | 10 | 7 |
| INI @ 0° C. | kJ/m$^2$ | 26 | 25 | 20 | 15 | 14 | 10 | 11 | 11 | 8 | 11 | 9 | 7 |
| MAI D/B | ° C. | −30 | −25 | 0 | −10 | 0 | RT | 0 | 10 | RT | >RT | >RT | >RT |
| MV @ 320° C., 1500 s$^{-1}$ | Pa·s | 170 | 333 | 137 | 183 | 231 | 130 | 200 | 225 | 127 | 190 | 193 | 116 |
| HDT | ° C. | 152 | 157 | 154 | 153 | 158 | 157 | 159 | 158 | 158 | 155 | 159 | 162 |
| Vicat B/50 | ° C. | 170 | 176 | 173 | 170 | 175 | 174 | 175 | 175 | 174 | 167 | 170 | 171 |

TABLE 2

| Table 2 | unit | E1 | E4 | E7 | E10 | E2 | E5 | E8 | E11 | E3 | E6 | E9 | E12 |
|---|---|---|---|---|---|---|---|---|---|---|---|---|---|
| PPP BP/BPA copolymer PC | % | 62.00 | 59.52 | 57.04 | 54.56 | 70.00 | 67.20 | 64.40 | 61.60 | 74.00 | 71.04 | 68.08 | 65.12 |
| PC-1 | % | 13.50 | 12.96 | 12.42 | 11.88 | 13.50 | 12.96 | 12.42 | 11.88 | 9.00 | 8.64 | 8.28 | 7.92 |
| PC-2 | % | 1.50 | 1.44 | 1.38 | 1.32 | 1.50 | 1.44 | 1.38 | 1.32 | 1.0 | 0.96 | 0.92 | 0.88 |
| PC-Si | % | 15.00 | 14.40 | 13.80 | 13.20 | 15.00 | 14.40 | 13.80 | 13.20 | | | | |
| Paraloid | % | 4.00 | 3.84 | 3.68 | 3.52 | | | | | 8.00 | 7.68 | 7.36 | 7.04 |
| SAN | % | 4.00 | 3.84 | 3.68 | 3.52 | | | | | 8.00 | 7.68 | 7.36 | 7.04 |
| Talc | % | 0 | 4 | 8 | 12 | 0 | 4 | 8 | 12 | 0 | 4 | 8 | 12 |
| Tensile modulus | MPa | 2185 | 2602 | 2905 | 3477 | 2290 | 2747 | 3114 | 3697 | 2244 | 2695 | 3132 | 3735 |
| INI @ 25° C. | kJ/m$^2$ | 30 | 19 | 12 | 12 | 28 | 16 | 12 | 10 | 23 | 12 | 9 | 7 |
| INI @ 0° C. | kJ/m$^2$ | 26 | 15 | 11 | 11 | 25 | 14 | 11 | 9 | 20 | 10 | 8 | 7 |
| MAI D/B | ° C. | −30 | −10 | 0 | >RT | −25 | 0 | 10 | >RT | 0 | RT | RT | >RT |
| MV @ 320° C., 1500 s$^{-1}$ | Pa·s | 170 | 183 | 200 | 190 | 333 | 231 | 225 | 193 | 137 | 130 | 127 | 116 |
| HDT | ° C. | 152 | 153 | 159 | 155 | 157 | 158 | 158 | 159 | 154 | 157 | 158 | 162 |
| Vicat B/50 | ° C. | 170 | 170 | 175 | 167 | 176 | 175 | 175 | 170 | 173 | 174 | 174 | 171 |

It was surprisingly noted that E1, E4, E7, and E10, which had a combination of impact modifiers, had a better combination of properties than expected. In particular, the multi-axial ductile/brittle transition temperature (MAI D/B) and viscosity values were much better than expected. The combination of the two impact modifiers provided better MAI D/B and better viscosity than either impact modifier alone. Improved impact performance did not result simply from greater amounts of impact modifier, i.e. the impact performance of a given composition could not be predicted simply based on the amount of impact modifier used. Also interesting was the decrease in viscosity seen in samples E2, E5, E8 and E11, where it was highest in sample E2, which had no talc, and lowest in sample E11, which had 12 wt % talc filler. This decrease in viscosity occurred as tensile modulus improved, both of which are desirable. This increased stiffness, without increased viscosity, can be useful for thinner part designs and application requiring stiffer polymer. Also, for E10, the HDT decreased at 12 wt % talc filler.

The thermoplastic compositions of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A thermoplastic composition comprising:
   a polycarbonate polymer (A) having repeating units derived from 2-phenyl-3,3-bis(4-hydroxyphenyl)phthalimidine (PPPBP);
   a polymer (B) which is different from polymer (A), wherein the polymer (B) is a bisphenol A homopolymer;
   an impact modifier (C) which is different from polymer (A) and polymer (B) consisting of a polycarbonate-polysiloxane copolymer and an acrylate polymer, wherein the polycarbonate-polysiloxane copolymer contains about 20 wt % siloxane units; and
   a mineral filler (D).

2. The thermoplastic composition of claim 1, wherein polymer (A) is a copolymer of PPPBP and bisphenol-A.

3. The thermoplastic composition of claim 1, wherein the polymer (A) comprises from about 10 to about 85 weight percent of the thermoplastic composition.

4. The thermoplastic composition of claim 1, wherein the polymer (B) comprises from about 5 to about 85 weight percent of the thermoplastic composition; and the impact modifier (C) comprises from about 5 to about 45 weight percent of the thermoplastic composition.

5. The thermoplastic composition of claim 1, wherein the mineral filler (D) comprises from about 1 to about 20 weight percent of the thermoplastic composition.

6. The thermoplastic composition of claim 1, wherein the thermoplastic composition has a heat deflection temperature of at least 150° C., when measured according to ISO 75.

7. The thermoplastic composition of claim 1, wherein the thermoplastic composition has an apparent viscosity of 200 Pa·sec or less, when measured at 320° C. and at a shear rate of 1500 sec$^1$.

8. The thermoplastic composition of claim 1, wherein the thermoplastic composition has a heat deflection temperature of at least 150° C., when measured according to ISO 75; and an apparent viscosity of 200 Pa·sec or less, when measured at 320° C. and at a shear rate of 1500 sec$^1$.

9. The thermoplastic composition of claim 1, wherein the mineral filler is talc.

10. The thermoplastic composition of claim 1, further comprising a styrene-acrylonitrile polymer (E) in an amount of from about 3 to about 15 weight percent of the thermoplastic composition.

11. An article formed from the thermoplastic composition of claim 1.

12. The thermoplastic composition of claim 1, wherein the composition has a tensile modulus of at least 2600 MPa when measured according to ISO 527; and a notched Izod impact strength of 10 kJ/m$^2$ or greater at 0° C., when measured according to ISO 180.

13. A thermoplastic composition comprising:
- a polycarbonate polymer (A) having repeating units derived from 2-phenyl-3,3-bis(4-hydroxyphenyl)phthalimidine (PPPBP);
- a polymer (B), wherein the polymer (B) is a bisphenol A homopolymer;
- an impact modifier (C) which is different from polymers (A) and (B), wherein the impact modifier (C) consists of a polycarbonate-polysiloxane copolymer and an acrylate polymer, wherein the polycarbonate-polysiloxane copolymer contains about 20 wt % siloxane units; and
- talc filler (D).

14. The thermoplastic composition of claim 13, wherein the talc filler (D) comprises from about 1 to about 20 weight percent of the thermoplastic composition.

15. The thermoplastic composition of claim 13, further comprising a styrene-acrylonitrile polymer (E) in an amount of from about 3 to about 15 weight percent of the thermoplastic composition.

16. The thermoplastic composition of claim 13, wherein the polymer (A) comprises from about 10 to about 85 weight percent of the thermoplastic composition; and
wherein impact modifier (C) comprises from about 5 to about 45 weight percent of the thermoplastic composition.

17. An article formed from the thermoplastic composition of claim 13.

18. The thermoplastic composition of claim 16, wherein the polycarbonate polymer (B) comprises from about 8 to about 15 weight percent of the thermoplastic composition.

* * * * *